United States Patent
Li et al.

(10) Patent No.: US 11,145,922 B2
(45) Date of Patent: Oct. 12, 2021

(54) SOLID-STATE BATTERY HAVING A CAPACITOR-ASSISTED INTERLAYER

(71) Applicant: GM Global Technology Operations LLC, Detroit, MI (US)

(72) Inventors: Zhe Li, Shanghai (CN); Xiaochao Que, Shanghai (CN); Haijing Liu, Shanghai (CN); Qili Su, Shanghai (CN); Yong Lu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 176 days.

(21) Appl. No.: 16/684,070

(22) Filed: Nov. 14, 2019

(65) Prior Publication Data

US 2021/0021009 A1    Jan. 21, 2021

(30) Foreign Application Priority Data

Jul. 16, 2019  (CN) .......................... 201910639729.6

(51) Int. Cl.

| | |
|---|---|
| H01M 4/02 | (2006.01) |
| H01M 16/00 | (2006.01) |
| H01M 10/0525 | (2010.01) |
| H01M 10/0566 | (2010.01) |
| H01G 11/08 | (2013.01) |
| H01G 11/10 | (2013.01) |

(Continued)

(52) U.S. Cl.
CPC ............ *H01M 16/00* (2013.01); *H01G 11/06* (2013.01); *H01G 11/08* (2013.01); *H01G 11/10* (2013.01); *H01G 11/36* (2013.01); *H01G 11/46* (2013.01); *H01G 11/50* (2013.01); *H01G 11/56* (2013.01); *H01M 10/0525* (2013.01); *H01M 10/0566* (2013.01); H01M 2300/0025 (2013.01); H01M 2300/0065 (2013.01)

(58) Field of Classification Search
CPC ....................................................... H01M 4/02
See application file for complete search history.

(56) References Cited

U.S. PATENT DOCUMENTS

2019/0157659 A1*  5/2019  Liu ........................ H01G 11/50

* cited by examiner

*Primary Examiner* — Jacob B Marks

(57) ABSTRACT

A solid-state battery cell having a capacitor interlayer is disclosed. The solid-state battery includes an anode, a cathode spaced from the anode, a solid-state electrolyte layer disposed between the anode and the cathode, and a capacitor assisted interlayer sandwiched between at least one of (i) the anode and solid-state electrolyte layer, and (ii) the cathode and the solid-state electrolyte layer. The capacitor assisted interlayer comprise at least one of a polymer-based material, an inorganic material, and a polymer-inorganic hybrid material; and a capacitor anode active material or a capacitor cathode active material. The polymer-based material includes at least one of a poly(ethylene glycol) methylether acrylate with $Al_2O_3$ and LiTFSI, a polyethylene oxide (PEO) with LiTFSI, and a poly(vinylidene fluoride) copolymer with hexafluoropropylene (PVDF-HFP)-based gel electrolyte. The inorganic material includes a 70% $Li_2S$-29% $P_2S_5$-1% $P_2O_5$. The polymer-inorganic hybrid material includes a mixture of PEO, LiTFSI, and 75% $Li_2S$-24% $P_2S_5$-1% $P_2O_5$ (LPOS).

20 Claims, 2 Drawing Sheets

(51) Int. Cl.
*H01G 11/56* (2013.01)
*H01G 11/50* (2013.01)
*H01G 11/06* (2013.01)
*H01G 11/46* (2013.01)
*H01G 11/36* (2013.01)

SOLID-STATE BATTERY HAVING A CAPACITOR-ASSISTED INTERLAYER

INTRODUCTION

The present disclosure relates to rechargeable solid-state batteries and, more particularly, solid-state batteries having a capacitor-assisted interlayer.

Rechargeable batteries are known to be used in consumer electronic applications from small electronic devices, such as cell phones to larger electronic devices such as laptop computers. Modern rechargeable batteries, such as rechargeable lithium ion batteries have the ability to hold a relatively high energy density as compared to older types of rechargeable batteries such as nickel metal hydride, nickel cadmium, or lead acid batteries. A benefit of rechargeable lithium ion batteries is that the batteries can be completely or partially charged and discharged over many cycles without retaining a charge memory. In addition, rechargeable lithium ion batteries can be used in larger applications, such as for electric and hybrid vehicles due to the batteries' high power density, long cycle life, and ability to be formed into a wide variety of shapes and sizes so as to efficiently fill available space in such vehicles.

Modern rechargeable lithium ion batteries typically utilizes organic liquid electrolyte to carry or conduct lithium cations (Li+) between a cathode active material and an anode active material. To further enhance battery performance, organic liquid electrolyte is replaced by solid-state electrolyte (SSE) in more modern batteries. Solid-state electrolytes could broaden the working temperature range and improve energy density of rechargeable lithium ion batteries. Rechargeable lithium ion batteries having solid-state electrolytes are known to be referred to as rechargeable solid-state lithium batteries.

Rechargeable solid-state lithium batteries typically include a positive electrode layer, a negative electrode layer, a solid electrolyte layer disposed between the positive electrode layer and negative electrode layer. However, if the contacts between the solid electrolyte layer and the electrode layers are poor, it will suppress the Li-ion transport, increase the interfacial resistance, and enlarge the polarization during cycling. Thus, while rechargeable solid-state lithium batteries achieve their intended purpose for use in electric and hybrid vehicles, there is still a need for continuous improvement to achieve a favorable interfacial contact between the electrode layers and solid-state electrolyte layer to increase the electrochemical performance of these types of batteries.

SUMMARY

According to several aspects, a solid-state battery cell is disclosed. The solid-state battery cell includes an anode; a cathode spaced from the anode; a solid-state electrolyte layer disposed between the anode and the cathode; and a capacitor assisted interlayer sandwiched between at least one of (i) the anode and solid-state electrolyte layer and (ii) the cathode and the solid-state electrolyte layer.

In an additional aspect of the present disclosure, the solid state battery cell further includes a separator interlayer sandwiched between the cathode and the solid-state electrolyte layer. The capacitor assisted interlayer is sandwiched between the anode and the solid-state electrolyte layer and is in intimate contact with both the anode and the solid-state electrolyte layer.

In another aspect of the present disclosure, the solid state battery cell further includes a separator interlayer sandwiched between the anode and the solid-state electrolyte layer. The capacitor assisted interlayer is sandwiched between the cathode and the solid-state electrolyte layer and is in intimate contact with both the cathode and the solid-state electrolyte layer.

In another aspect of the present disclosure, the capacitor assisted interlayer includes a first capacitor assisted interlayer sandwiched between and in intimate contact with the anode and the solid-state electrolyte layer, and a second capacitor assisted interlayer sandwiched between and in intimate contact with the cathode and the solid-state electrolyte layer.

In another aspect of the present disclosure, the first capacitor assisted interlayer comprises a capacitor anode active material including at least one of an activated carbon, a soft carbon, a hard carbon, a metal oxide, and a metal sulfide. The second capacitor assisted interlayer comprises a capacitor cathode active material including at least one of activated carbon, graphene, carbon nano-tubes (CNT), and a conducting polymer.

In another aspect of the present disclosure, the capacitor assisted interlayer comprises a polymer-based material including at least one of: a poly(ethylene glycol) methylether acrylate mixed with a $Al_2O_3$ and a LiTFSI, a polyethylene oxide (PEO) mixed with a LiTFSI, and a poly(vinylidene fluoride) copolymer with a hexafluoropropylene (PVDF-HFP)-based gel electrolyte.

In another aspect of the present disclosure, the capacitor assisted interlayer comprises an inorganic material including at least one of a 70% $Li_2S$-29% $P_2S_5$-1% $P_2O_5$ in mol %, and a polymer-inorganic hybrid material including a PEO+LiTFSI+75% $Li_2S$-24% $P_2S_5$-1% $P_2O_5$ (LPOS) in mol %.

In another aspect of the present disclosure, the capacitor assisted interlayer comprises at least one of Nb, Al, Si, and $Al_2O_3$.

In another aspect of the present disclosure, the separator interlayer is free of a capacitor active material.

In another aspect of the present disclosure, the solid-state battery cell further includes a liquid electrolyte comprising at least one of an ionic liquid including Li(triethylene glycol dimethyl ether)bis(trifluoromethanesulfonyl)imide (Li(G3) TFSI), a carbonate-based electrolyte including LiPF6 in EC/DEC, and a concentrated electrolyte including a LiTFSI in acetonitrileTFSI.

According to several aspects, a rechargeable solid-state lithium ion battery cell is disclosed. The rechargeable solid-state lithium ion battery cell, includes a cathode having a lithium-based active material capable of storing lithium; an anode comprising a lithium host material capable of storing lithium at a lower electrochemical potential relative to the cathode; a solid-state electrolyte layer disposed between the anode and the cathode; and a first capacitor assisted interlayer sandwiched between and in intimate contact with the anode and the solid-state electrolyte layer.

In an additional aspect of the present disclosure, the first capacitor assisted interlayer further comprises a capacitor anode active material including at least one of an activated carbon, a soft carbon, a hard carbon, a metal oxide, and a metal sulfides.

In another aspect of the present disclosure, the rechargeable solid-state lithium ion battery cell further includes a second capacitor assisted interlayer sandwiched between and in contact with the cathode and the solid-state electrolyte layer.

In another aspect of the present disclosure, the second capacitor assisted interlayer includes a capacitor cathode active material including at least one of an activated carbon, a graphene, a carbon nanotubes (CNT), a porous carbon material, and a conducting polymer such as Poly(3,4-ethylenedioxythiophene).

In another aspect of the present disclosure, at least one of the first capacitor assisted interlayer and the second capacitor assisted interlayer, includes a polyethylene oxide (PEO) with LiTFSI.

In another aspect of the present disclosure, at least one of the first capacitor assisted interlayer and the second capacitor assisted interlayer, includes a mixture comprising of PEO, LiTFSI, and 75% Li2S-24% P2S5-1% $P_2O_5$ (LPOS) in mol %.

In another aspect of the present disclosure, the rechargeable solid-state lithium ion battery cell further includes a liquid electrolyte permeating the solid electrolyte layer, the capacitor assisted interlayer, the anode, and the cathode.

According to several aspects, a rechargeable solid-state lithium ion battery comprising a plurality of battery cells. At least one of the battery cells includes a cathode comprising a lithium-based active material capable of storing lithium; an anode comprising a lithium host material capable of storing lithium at a lower electrochemical potential relative to the cathode; a solid-state electrolyte layer disposed between the anode and the cathode; a capacitor assisted interlayer sandwiched between the anode and the solid-state electrolyte layer. The capacitor assisted interlayer is in intimate contact with the anode and the solid-state electrolyte layer. The capacitor assisted interlayer includes a capacitor anode active material including at least one of an activated carbon, a soft carbon, a hard carbon, a metal oxide, and a metal sulfide, and a thickness of between about 20 nanometer and about 200 micrometers. The capacitor assisted interlayer further includes a polyethylene oxide (PEO) with LiTFSI.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
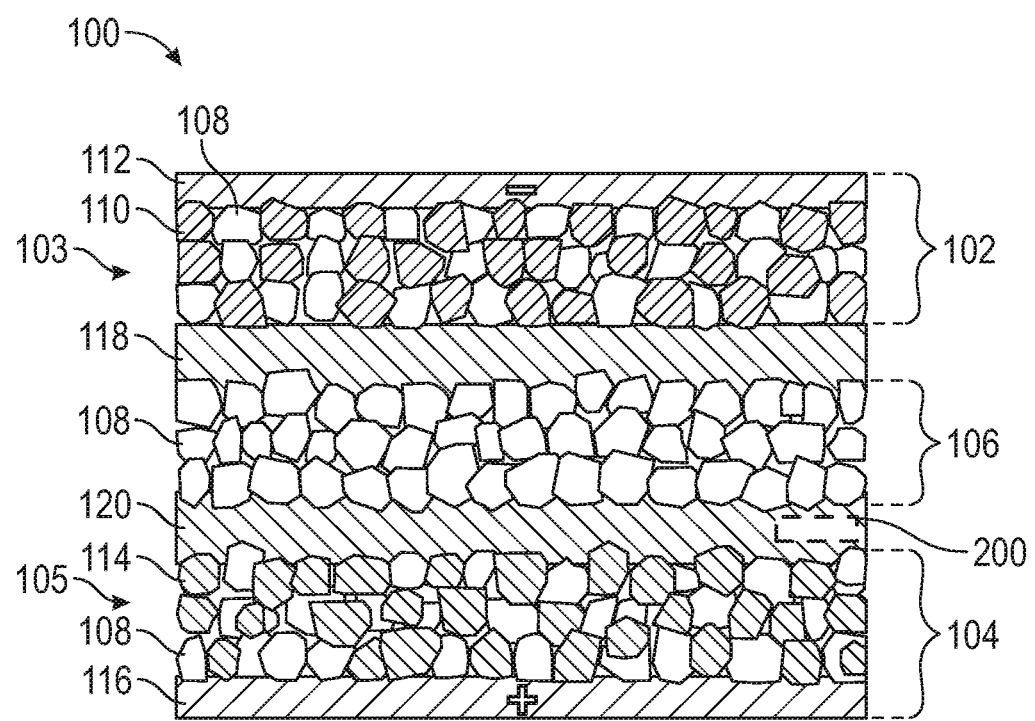
FIG. 1 is a diagrammatic representation of a rechargeable solid-state lithium battery cell structure having capacitor-assisted interlayers, according to an exemplary embodiment.

FIG. 1 shows an exemplary embodiment of a diagrammatic representation of a rechargeable solid-state lithium battery cell having at least one capacitor-assisted interlayer, generally indicated by reference number 100 (solid-state battery cell 100). A plurality of the solid-state battery cells may be folded or stacked to form a rechargeable solid-state lithium battery. The solid-state battery cell 100, also referred to as a hybrid solid-state battery cell 100, includes a negative electrode 102, a positive electrode 104, and a solid-state electrolyte layer 106 disposed between the negative electrode 102 and the positive electrode 104. The solid-state electrolyte layer 106 includes a solid-state electrolyte material 108 such as $Li_{10}GeP_2S_{12}$ (LGPS). The negative electrode 102 is also referred to as an anode 102 and the positive electrode 104 is also referred to as a cathode 104.

The negative electrode 102 includes an anode layer 103 and a negative current collector 112. The anode layer 103 comprises the same solid-state electrolyte material 108 as the solid-state electrolyte layer 106 and an anode active material 110. A first capacitor-assisted interlayer 118, is disposed between the negative electrode 102 and the solid-state electrolyte layer 106 such that the first capacitor assisted interlayer 118 is in direct intimate contact with both the negative electrode 102 and the solid-state electrolyte layer 106.

The positive electrode 104 includes a cathode layer 105 and a positive current collector 116. The cathode layer 105 comprises the same solid-state electrolyte material 108 as the solid-state electrolyte layer 106 and a cathode active material 114. A second capacitor assisted interlayer 120 is disposed between the positive electrode 104 and the solid-state electrolyte layer 106 such that the second capacitor assisted interlayer 114 is in direct intimate contact with both the positive electrode 104 and the solid-state electrolyte layer 106.

While the exemplary embodiment of the solid-state battery cell 100 is presented as having both a first capacitor assisted interlayer 118 and a second capacitor assisted interlayer 120, it is appreciated that alternative embodiments may have a single capacitor assisted interlayer. The single capacitor assisted interlayer may be disposed between the negative electrode 102 and the solid-state electrolyte layer 106, or disposed between the positive electrode 104 and the solid-state electrolyte material 106 without departing from the scope of the invention. The capacitor assisted interlayers 118, 120 enable a favorable and intimate interfacial contact between the electrodes 102, 104 and the solid-state electrolyte layer 106, and reduce the interfacial resistance. The incorporated capacitor active material can enhance the power response due to capacitor active material's quick ion adsorbing and desorbing capabilities, and effectively improves electrochemical performance of the solid-state battery cell 100.

In the exemplary embodiment of the battery cell 100, the anode layer 103 in the negative electrode 102 includes a thickness of between about 1 micrometer and about 1000 micrometers. The negative current collector 112 includes a thickness of between about 4 micrometers and about 100 micrometers. The negative current collector 112 is preferably a thin-film copper or nickel foil that coextensively contacts the anode layer 103. The anode layer 103 is preferably formed of a solid-state electrolyte material 108, an anode active material 110, an optional conductive additive, and an optional binder. The anode active material 110 includes a lithium host material that is capable of storing lithium at a lower electrochemical potential relative to the cathode active material 114. The anode active material 110 may include a carbonaceous material such as graphite, hard carbon, and soft carbon; silicon; silicon-graphite mixture; lithium titanate ($Li_4Ti_5O_{12}$); a transition-metal such as Sn; a metal oxide or metal sulfide such as $TiO_2$, FeS, $SnO_2$, and other lithium-accepting anode materials such as lithium-Indium (Li—In).

The conductive additive of the anode material 110 may include any suitable material such as carbon black, graphite, graphene, graphene oxide, Super P, acetylene black, carbon nanofibers, carbon nanotubes and other electronically conductive additives. The binder of the anode material may include poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), and styrene butadiene styrene copolymer (SBS).

In the exemplary embodiment of the battery cell 100, the cathode layer 105 in the positive electrode 104 includes a thickness of between about 1 micrometer and about 1000 micrometers. The positive current collector 116 includes a thickness of between about 4 micrometers and about 100 micrometers. The positive current collector 116 is preferably a thin-film aluminum foil that coextensively contacts the cathode layer 105. The cathode layer 105 is preferably formed of a solid-state electrolyte material 108, a cathode active material 114, an optional conductive additive, and an optional binder. The cathode active material 114 includes one or more lithium-based active material that is capable of storing lithium. Examples of such lithium-based active materials include, but are not limited to, Lithium manganese oxide ($LiMn_2O_4$) and $LiNbO_3$-coated $LiMn_2O_4$. One or more polymeric binder materials, such as polyvinyldiene fluoride (PVdF), an ethylene propylene diene monomer (EPDM) rubber, a poly(tetrafluoroethylene) (PTFE), styrene-butadiene rubber (SBR), and a carboxymethoxy cellulose (CMC) may be intermingled with the lithium-based active material to provide the cathode with increased structural integrity.

Figure 2:
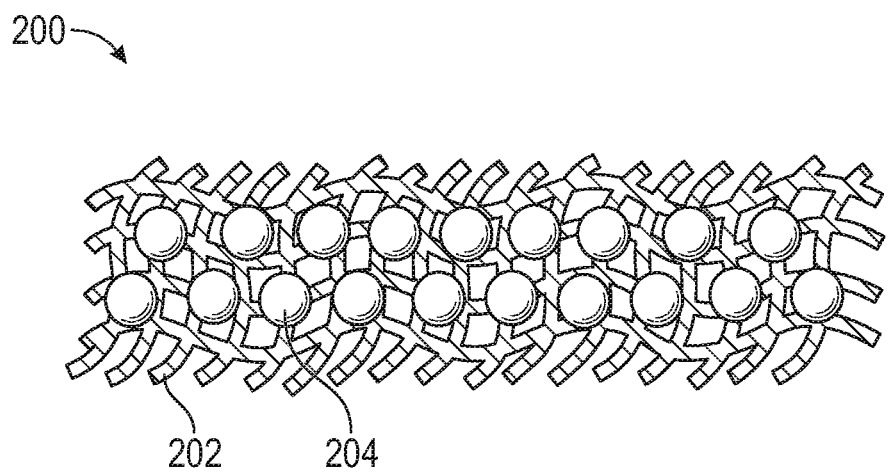
FIG. 2 is a diagrammatic representation of a capacitor-assisted interlayer.

FIG. 2 is an enlarged view of a portion of a capacitor assisted interlayer 200. In the presented embodiment, the capacitor assisted interlayer 200 includes a thickness of between about 20 nanometer and about 200 micrometers. It is appreciated that the basic disclosure of the capacitor assisted interlayer 200 applies to both the first and second capacitor assisted interlayers 118, 120 of FIG. 1. The capacitor-assisted interlayer 200 decreases the interfacial resistance between the electrodes and solid-state electrolyte, enables an effective ion adsorbing and desorbing, and provides a quick power response for the solid-state battery cell 100 due to its capacitor feature.

The capacitor-assisted interlayer 200 includes a base structure 202 formed of one or more of a polymer-based material, an inorganic material, a polymer-Inorganic hybrid, and a metal and/or metal oxide material. The polymer-based material includes one or more of a poly(ethylene glycol) methylether acrylate with $Al_2O_3$ and lithium bis(trifluoromethanesulfonyl)imide (LiTFSI), polyethylene oxide (PEO) with LiTFSI, poly(vinylidene fluoride) copolymer with hexafluoropropylene (PVDF-HFP)-based gel electrolyte. The inorganic material includes 70% $Li_2S$-29% $P_2S_5$-1% $P_2O_5$. The polymer-inorganic hybrid material includes a mixture of PEO, LiTFSI, and 75% $Li_2S$-24% $P_2S_5$-1% $P_2O_5$ (LPOS) in mol %. The metal and metal oxide material include one or more of Nb, Al, Si and $Al_2O_3$.

The capacitor-assisted interlayer 200 further includes a capacitor active material 204, which may vary depending whether the capacitor-assisted interlayer functions as the first capacitor-assisted interlayer 118 disposed between the negative electrode 102 and the solid-state electrolyte layer 106, or the second capacitor-assisted interlayer 120 disposed between positive electrode 104 and the solid-state electrolyte layer 106.

The first capacitor-assisted interlayer 118 disposed between negative electrode 102 and the solid-state electrolyte layer 106 includes a capacitor anode active material comprising at least one of an activated carbon, soft carbon, hard carbon, metal oxide such as $TiO_2$, and metal sulfides. The second capacitor-assisted interlayer 120 disposed between positive electrode 104 and the solid-state electrolyte layer 106 includes a capacitor cathode active material 114 comprising at least one of an activated carbon, graphene, carbon nano-tubes (CNT), other porous carbon materials, a conducting polymer such as Poly(3,4-ethylenedioxythiophene), also known as PEDOT.

Figure 3:
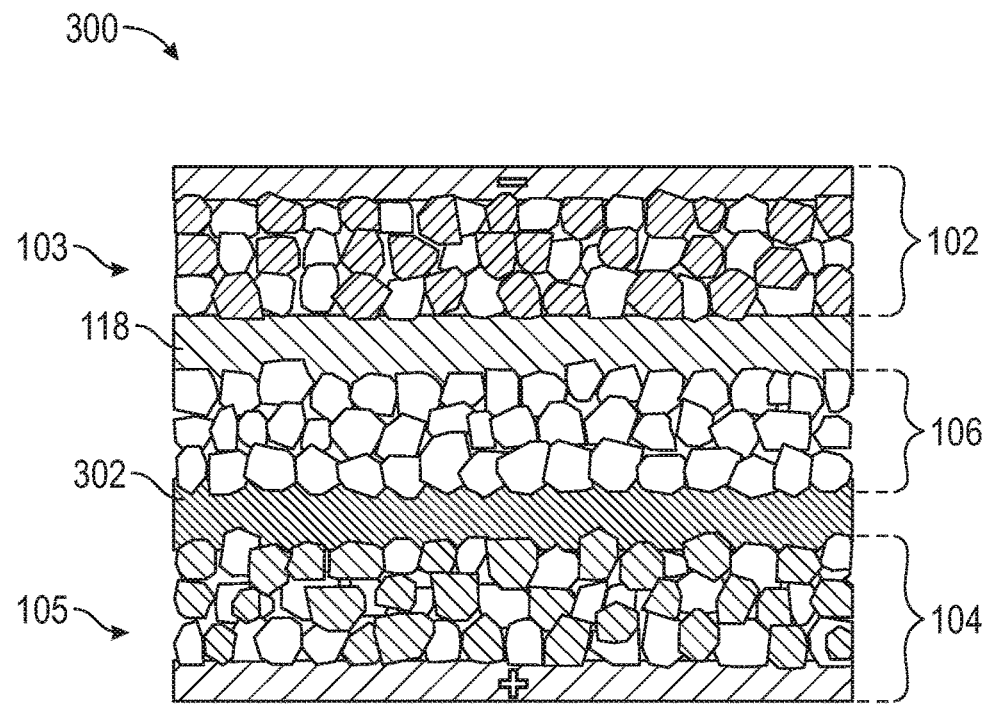
FIG. 3 is a diagrammatic representation of a cell structure having a capacitor-assisted interlayer adjacent the anode and a separator interlayer adjacent the cathode.

FIG. 3 shows an alternative embodiment of a solid-state battery cell 300 having a first capacitor-assisted interlayer 118 disposed between the negative electrode 102 and the solid-state electrolyte layer 106 such that the first capacitor assisted interlayer 118 is in direct contact with the negative electrode 102 and the solid-state electrolyte layer 106. The battery cell 300 also includes a separator interlayer 302 (without the addition of a capacitor active material) disposed between the positive electrode 104 and the solid-state electrolyte layer 106 such that the separator interlayer 302 is in direct contact with the positive electrode 104 and the solid-state electrolyte layer 106.

Figure 4:
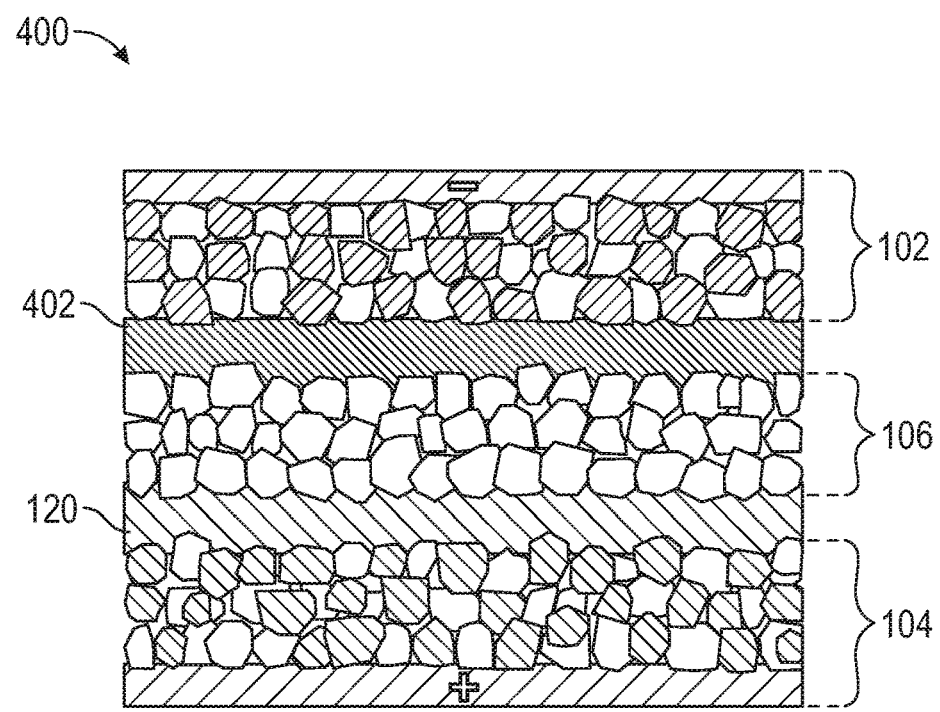
FIG. 4 is a diagrammatic representation of an alternative embodiment of a cell structure having a capacitor-assisted interlayer adjacent the cathode and a separator interlayer adjacent the anode.

FIG. 4 shows another alternative embodiment of a solid-state battery cell 400 having a second capacitor-assisted interlayer 120 disposed between the positive electrode 104 and the solid-state electrolyte layer 106 such that the second capacitor assisted interlayer 120 is in direct contact with the positive electrode 104 and the solid-state electrolyte layer 106. The battery cell 400 also includes a separator interlayer 402 (without the addition of capacitor active material) disposed between the negative electrode 102 and the solid-state electrolyte layer 106 such that the separator layer 402 is in direct contact with the negative electrode 102 and the solid-state electrolyte layer 106.

The separator interlayers 302, 402 of FIGS. 3 and 4 are formed of one or more of a polymer-based material, an inorganic material, a polymer-Inorganic hybrid, and a metal and/or metal oxide material. The polymer-based material includes one or more of a poly(ethylene glycol) methylether acrylate with $Al_2O_3$ and LiTFSI, polyethylene oxide (PEO) with LiTFSI, and poly(vinylidene fluoride) copolymer with hexafluoropropylene (PVDF-HFP)-based gel electrolyte. The inorganic material includes 70% Li2S-29% P2S5-1% P2O5 (mol %). The polymer-inorganic hybrid material is a mixture of PEO, LiTFSI and 75% $Li_2S$-24% $P_2S_6$-1% P2O5 (LPOS) in mol %. The metal and metal oxide material include one or more of Nb, Al, Si and $Al_2O_3$. The separator interlayers 302, 304 contain no capacitor active material.

Referring to FIG. 1, FIG. 3, and FIG. 4, each of the alternative solid-state battery cells 100, 300, 400 may include a liquid electrolyte to aid in the facilitation of the transfer of lithium ions between the anode active material 110 and the cathode active material 114. The liquid electrolyte includes, but not limited to, ionic liquids such as Li(triethylene glycol dimethyl ether) bis(trifluoromethanesulfonyl)imide (Li($G_3$)TFSI); carbonate-based electrolytes such as LiPF$_6$-EC/DEC with additives; and concentrated electrolytes such as LiTFSI in acetonitrile.

It is appreciated that the solid electrolyte layer 106 may include a first solid-state electrolyte, the anode 102 may include a second solid-state electrolyte, and the cathode 104 includes a third solid-state electrolyte. The first solid-state electrolyte, the second solid-state electrolyte, and the third solid-state electrolyte may by the same or different solid-state electrolytes selected from the following solid-state electrolytes (SSE):

Sulfide-based SSE, such as: Li$_2$S—P$_2$S$_5$, Li$_2$S—P$_2$S$_5$—MS$_x$, LGPS (Li$_{10}$GeP$_2$S$_{12}$), thio-LISICON (Li$_{3.25}$Ge$_{0.25}$P$_{0.75}$S$_4$), Li$_{3.4}$Si$_{0.4}$P$_{0.6}$S$_4$, Li$_{10}$GeP$_2$S$_{11.7}$O$_{0.3}$, lithium argyrodite Li$_6$PS$_5$X (X=Cl, Br, or I), Li$_{9.54}$Si$_{1.74}$P$_{1.44}$S$_{11.7}$O$_{0.3}$, Li$_{9.6}$P$_3$S$_{12}$, Li$_7$P$_3$S$_{11}$, Li$_9$P$_3$S$_9$O$_3$, Li$_{10.35}$Ge$_{1.35}$P$_{1.65}$S$_{12}$, Li$_{10.35}$Si$_{1.35}$P$_{1.65}$S$_{12}$, Li$_{9.81}$Sn$_{0.81}$P$_{2.19}$S$_{12}$, Li$_{10}$(Si$_{0.5}$Ge$_{0.5}$)P$_2$S$_{12}$, Li$_{10}$(Ge$_{0.5}$Sn$_{0.5}$)P$_2$S$_{12}$, Li$_{10}$(Si$_{0.5}$Sn$_{0.5}$)P$_2$S$_{12}$;

Oxide-based SSE, such as: perovskite type (Li$_{3x}$La$_{2/3-x}$TiO$_3$), NASICON type (LiTi$_2$(PO$_4$)$_3$), Li$_{1+x}$Al$_x$Ti$_{2-x}$(PO$_4$)$_3$ (LATP), Li$_{1+x}$Al$_x$Ge$_{2-x}$(PO$_4$)$_3$ (LAGP), Li$_{1-x}$Y$_x$Zr$_{2-x}$(PO$_4$)$_3$ (LYZP), LISICON type (Li$_{14}$Zn(GeO$_4$)$_4$), Garnet type (Li$_{6.5}$La$_3$Zr$_{1.75}$Te$_{0.25}$O$_{12}$);

Polymer-based SSE, such as: the polymer host together with a lithium salt act as a solid solvent. Polymer: PEO, PPO, PEG, PMMA, PAN, PVDF, PVDF-HFP, PVC;

Nitride-based SSE, such as: Li$_3$N, Li$_7$PN$_4$, LiSi$_2$N$_3$;

Hydride-based SSE, such as: LiBH$_4$, LiBH$_4$—LiX (X=Cl, Br or I), LiNH$_2$, Li$_2$NH, LiBH$_4$—LiNH$_2$, Li$_3$AlH$_6$;

Halide-based, such as: LiI, Li$_2$CdC$_{14}$, Li$_2$MgCl$_4$, Li$_2$CdI$_4$, Li$_2$ZnI$_4$, Li$_3$OCl;

Borate-based SSE, such as: Li$_2$B$_4$O$_7$, Li$_2$O—B$_2$O$_3$—P$_2$O$_5$;

Inorganic SSE/polymer-based hybrid electrolyte; and

Surface-modified SSE.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A solid-state battery cell, comprising:
   an anode;
   a cathode spaced from the anode;
   a solid-state electrolyte layer disposed between the anode and the cathode; and
   a capacitor assisted interlayer sandwiched between at least one of (i) the anode and solid-state electrolyte layer and (ii) the cathode and the solid-state electrolyte layer.

2. The solid-state battery cell of claim 1, further comprising:
   a separator interlayer sandwiched between the cathode and the solid-state electrolyte layer;
   wherein the capacitor assisted interlayer is sandwiched between the anode and the solid-state electrolyte layer, and the capacitor assisted interlayer is in intimate contact with both the anode and the solid-state electrolyte layer.

3. The solid-state battery cell of claim 1, further comprising:
   a separator interlayer sandwiched between the anode and the solid-state electrolyte layer;
   wherein the capacitor assisted interlayer is sandwiched between the cathode and the solid-state electrolyte layer, and the capacitor assisted interlayer is in intimate contact with both the cathode and the solid-state electrolyte layer.

4. The solid-state battery cell of claim 1, wherein the capacitor assisted interlayer comprises:
   a first capacitor assisted interlayer sandwiched between and in intimate contact with the anode and the solid-state electrolyte layer, and
   a second capacitor assisted interlayer sandwiched between and in intimate contact with the cathode and the solid-state electrolyte layer.

5. The solid-state battery cell of claim 4, wherein:
   the first capacitor assisted interlayer comprises a capacitor anode active material including at least one of an activated carbon, a soft carbon, a hard carbon, a metal oxide, and a metal sulfide; and
   the second capacitor assisted interlayer comprises a capacitor cathode active material including at least one of activated carbon, graphene, carbon nano-tubes (CNT), and a conducting polymer.

6. The solid-state battery cell of claim 1, wherein the capacitor assisted interlayer comprises:
   a polymer-based material including at least one of: a poly(ethylene glycol) methylether acrylate with a Al$_2$O$_3$ and a lithium bis(trifluoromethanesulfonyl)imide (LiTFSI), a polyethylene oxide (PEO) with a LiTFSI, and a poly(vinylidene fluoride) copolymer with a hexafluoropropylene (PVDF-HFP)-based gel electrolyte; and
   at least one of a capacitor anode active material and a capacitor cathode active material.

7. The solid-state battery cell of claim 1, wherein the capacitor assisted interlayer comprises:
   an inorganic material including at least one of a 70% Li$_2$S-29% P$_2$S$_5$-1% P$_2$O$_5$ in mol %, and a polymer-inorganic hybrid material including a mixture of PEO, LiTFSI, and 75% Li$_2$S-24% P$_2$S$_5$-1% P$_2$O$_5$ (LPOS) in mol %; and
   at least one of a capacitor anode active material and a capacitor cathode active material.

8. The solid-state battery cell of claim 1, wherein the capacitor assisted interlayer comprises:
   at least one of Nb, Al, Si, and Al$_2$O$_3$, and
   at least one of a capacitor anode active material and a capacitor cathode active material.

9. The solid-state battery cell of claim 2, wherein the separator interlayer is free of a capacitor active material.

10. The solid-state battery cell of claim 1, further comprising a liquid electrolyte comprising at least one of an ionic liquid including Li(triethylene glycol dimethyl ether) bis(trifluoromethanesulfonyl)imide (Li(G$_3$)TFSI), a carbonate-based electrolyte including LiPF$_6$-EC/DEC, and a concentrated electrolyte including LiTFSI in acetonitrile.

11. A rechargeable solid-state lithium ion battery cell, comprising:
   a cathode comprising a lithium-based active material capable of storing lithium;
   an anode comprising a lithium host material capable of storing lithium at a lower electrochemical potential relative to the cathode;
   a solid-state electrolyte layer disposed between the anode and the cathode; and
   a first capacitor assisted interlayer sandwiched between the anode and the solid-state electrolyte layer, wherein the first capacitor assisted interlayer is in intimate contact with both the anode and the solid-state electrolyte layer.

12. The rechargeable solid-state lithium ion battery cell of claim 11, wherein the first capacitor assisted interlayer further comprises a capacitor anode active material having at least one of an activated carbon, a soft carbon, a hard carbon, a metal oxide, and a metal sulfides.

13. The rechargeable solid-state lithium ion battery cell of claim 12, further comprising a second capacitor assisted interlayer sandwiched between the cathode and the solid-state electrolyte layer, wherein the second capacitor assisted interlayer is in intimate contact with both the cathode and the solid-state electrolyte layer.

14. The rechargeable solid-state lithium ion battery cell of claim 13, wherein the second capacitor assisted interlayer comprises a capacitor cathode active material including at least one of an activated carbon, a graphene, a carbon nano-tubes (CNT), a porous carbon material, and a conducting polymer.

15. The rechargeable solid-state lithium ion battery cell of claim 14, wherein the conducting polymer is a Poly(3,4-ethylenedioxythiophene).

16. The rechargeable solid-state lithium ion battery cell of claim 14, wherein at least one of the first capacitor assisted interlayer and the second capacitor assisted interlayer, comprises a polyethylene oxide (PEO) with LiTFSI.

17. The rechargeable solid-state lithium ion battery cell of claim 14, wherein at least one of the first capacitor assisted interlayer and the second capacitor assisted interlayer, comprises a mixture comprising of a polyethylene oxide (PEO), a LiTFSI, and a 75% $Li_2S$-24% $P_2S_5$-1% $P_2O_5$ (LPOS) in mol %.

18. The rechargeable solid-state lithium ion battery cell of claim 11,
wherein the solid-state electrolyte layer includes a first solid-state electrolyte, the anode includes a second solid-state electrolyte, and the cathode includes a third solid-state electrolyte, and
wherein the first solid-state electrolyte, the second solid-state electrolyte, and the third solid-state electrolyte are different solid electrolytes.

19. The rechargeable solid-state lithium ion battery cell of claim 18, further includes a liquid electrolyte permeating the solid electrolyte layer, at least one of the first capacitor assisted interlayer and the second capacitor assisted interlayer the anode, and the cathode.

20. A rechargeable solid-state lithium ion battery having a plurality of battery cells, wherein at least one of the plurality of battery cells comprises:
a cathode comprising a lithium-based active material capable of storing lithium;
an anode comprising a lithium host material capable of storing lithium at a lower electrochemical potential relative to the cathode;
a solid-state electrolyte layer disposed between the anode and the cathode;
a capacitor assisted interlayer intimately sandwiched between the cathode and the solid-state electrolyte layer, wherein the capacitor assisted interlayer includes a capacitor anode active material including at least one of an activated carbon, a soft carbon, a hard carbon, a metal oxide, and a metal sulfide, and a thickness of between about 20 nanometer and about 200 micrometers.

* * * * *